United States Patent [19]

Legorreta-Sanchez

[11] 3,770,349
[45] Nov. 6, 1973

[54] METHOD AND APPARATUS FOR AUTOMATICALLY CLASSIFYING COMPLEX, MICROSCOPIC PARTICLES SUCH AS HUMAN CELLS

[76] Inventor: Gilardo Legorreta-Sanchez, 13806 Hubbard Blvd., Los Angeles, Calif.

[22] Filed: May 12, 1971

[21] Appl. No.: 142,737

Related U.S. Application Data

[60] Division of Ser. No. 809,476, March 17, 1969, Pat. No. 3,675,768, which is a continuation of Ser. No. 435,377, Feb. 25, 1965, abandoned.

[52] U.S. Cl.............. 356/73, 250/71 R, 250/218, 356/39, 356/102, 356/103, 356/201
[51] Int. Cl.. G01n 21/00, G01n 33/16, G01n 15/02
[58] Field of Search ............... 356/39, 51, 73, 102, 356/103, 201; 250/43.5 R, 83.3 UV, 218, 71 R

[56] References Cited
UNITED STATES PATENTS 3,315,229   4/1967   Smithline ........................ 356/39
2,875,666   3/1959   Parker et al. ..................... 356/39
3,327,119   6/1967   Kamentsky ....................... 356/39
3,327,117   6/1967   Kamentsky .................. 250/43.5 R Primary Examiner—David Schonberg
Assistant Examiner—V. P. McGraw
Attorney—Edwin A. Oser

[57] ABSTRACT

Apparatus for classifying, counting and segregating microscopic particles such as cells. The particles may be contained in a gas or liquid and may be classified by measuring two characteristics thereof such as the size of the nucleus and the size or volume of the cell. This permits counting and separating of red blood corpuscules from leucocytes in the same solution. Normal and atypical cells may also be physically separated. The size of the nucleus may be measured by transmitted light and the size of the cell by scattered light.

14 Claims, 7 Drawing Figures

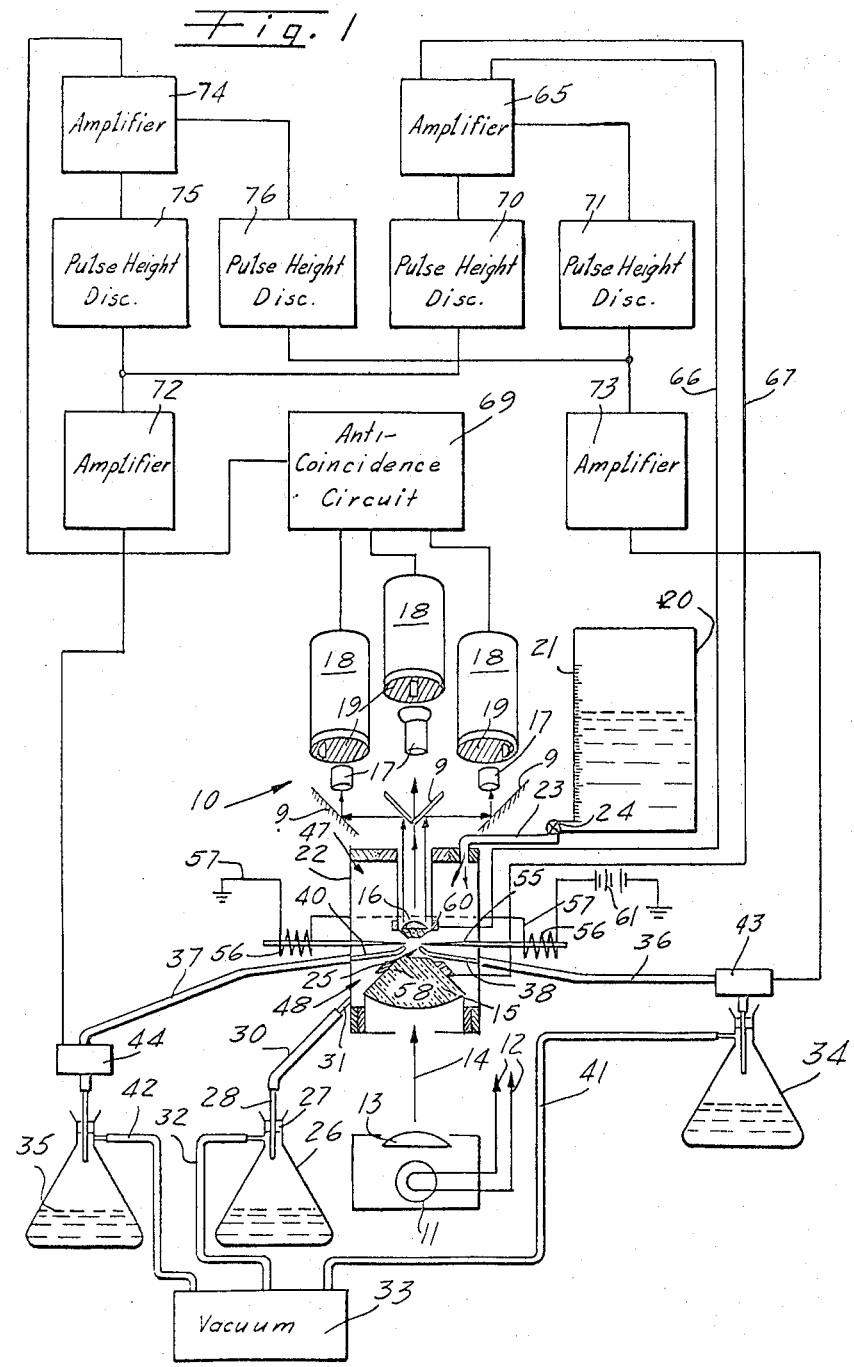

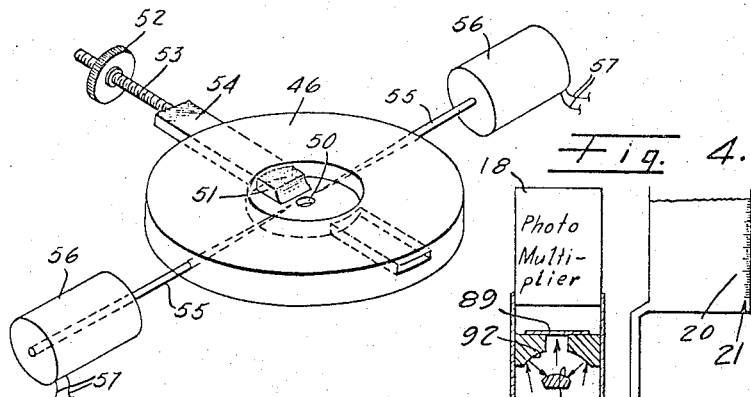
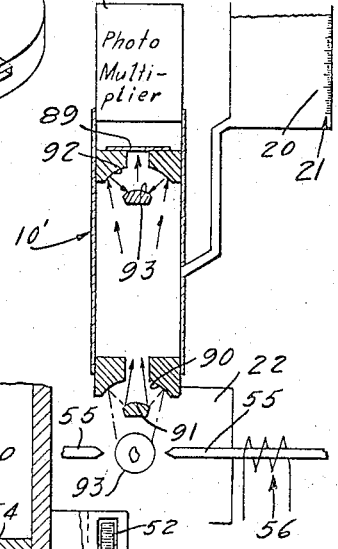
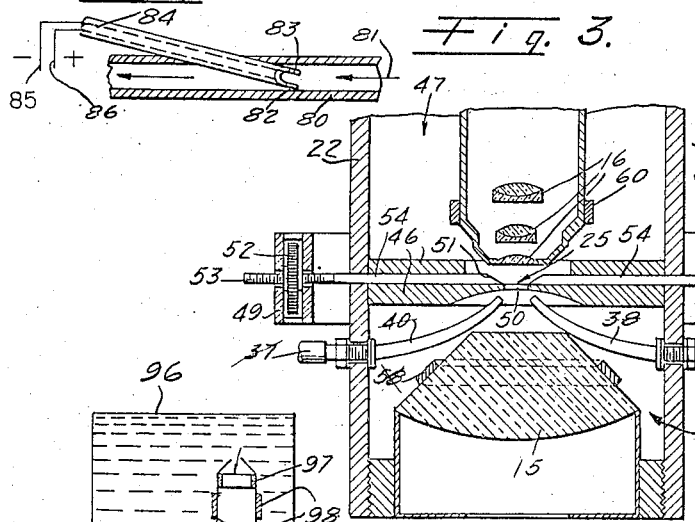
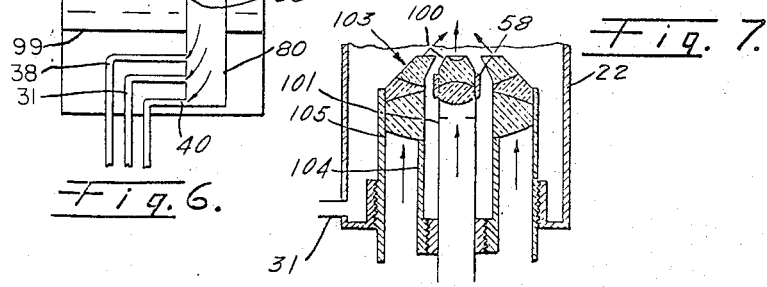

METHOD AND APPARATUS FOR AUTOMATICALLY CLASSIFYING COMPLEX, MICROSCOPIC PARTICLES SUCH AS HUMAN CELLS

This application is a division of copending application Ser. No. 809,476 filed March 17, 1969, now U.S. Pat. No. 3,675,768 issued on July 11, 1972 which in turn is a continuing application of Ser. No. 435,377 filed on Feb. 25, 1965, now abandoned.

This invention relates generally to the automatic investigation of microscopic particles, and more particularly relates to a method of and apparatus for classifying, counting or segregating particles such as cells suspended in a liquid in accordance with certain characteristics thereof.

Techniques of observing particles through a microscope are constantly being improved. These techniques include those utilizing monochromatic light for illuminating the object, such as ultraviolet light which, of course, improves the resolution. Recently, various techniques have been developed to obtain automatic observations by means of a microscope. This includes the use of electronic photomultipliers and other light sensitive devices to measure the change in light intensity or to detect the color of an object to be observed. They may also be used to measure the light received from individual spots of the object which form the image so that the light intensity or the area of an image may be recorded and measured. In order to obtain such automatic observations, various electronic devices have been attached to the microscope to process the electric signals, such as pulses, to which the image may be converted. In some cases it has even been suggested to utilize electronic memory devices and computers to store information and to process it. The development of techniques of processing biological tissues by histochemical methods even permit the identity of a specific substance within a cell.

Some of these recent procedures have found clinical application, others are used as research tools to provide information on the physiology of cells. The result of this continuous improvement in tissue processing and improvements in microscopes and electronics utilized in connection with a microscope to process information automatically are apparatuses such as the cytoanalizer, the flying-spot microscope, utilizing a flying-spot television technique, a television microscope where the image produced by the microscope is televised, the latter may even use ultraviolet light. Additionally, such devices include a microdensitometer, microcytophotometer, microspectrophotometer, or fluorometric devices.

However, regardless of the sophistication of the optical or electronic components, all of these devices have a common feature. The object to be investigated is deposited or attached to a transparent material such as a glass slide. The glass slide is put on the microscope stage and, accordingly, the object can be made to move roughly within the focal plane of the microscope. The focal plane of a microscope may be defined as an area between the focal length and twice the focal length of the microscope objective. It is known that all objects within that area produce a sharp image through the optical system.

The fact that the object must be attached to a transparent material or glass slide has a number of disadvantages. Thus, when the glass slides are changed to observe another object, the new object moves into the area of observation along the focal plane of the microscope. This is also true when the glass plate is moved to observe another object thereon. The result of this movement is that the new object is no longer in focus. This is primarily due to the fact that the thickness of the focal plane is very small so that any object readily moves out of the focal plane. For this reason, all microscopes have a coarse and a fine adjustment which cause movement of the objective. Hence, in order to produce a sharp image, it is almost always necessary to adjust at least the fine vertical movement of the microscope.

Some microscopes used for automatic work have a stage coupled to a scanning apparatus so that the stage is caused to have oscillatory movements such as a zig-zag movement. This makes it possible to observe the entire surface of the glass slide on which some object has been deposited. During this scanning operation the object frequently goes out of focus making it impossible to produce a sharp image. This, in turn, leads to error and makes it impossible to continue the automatic scanning. Various attempts have been made in the past to overcome this drawback. However, this requires complicated arrangements and, therefore, none of these has succeeded.

Apparatus is available commercially at this time where blood cells are counted by diluting them in transparent liquid, and letting them move along the focal plane of a microscope or under dark field illumination. Hence, an object moving along the focal plane will scatter the light and produce pulses in a photomultiplier attached to the microscope. Hence, the individual cells move parallel to or within the focal plane of the optical system. If the particle moves at right angles to the focal plane within the capillary tube along which the object moves, the object, of course, goes out of focus. In addition, the curved capillary tube, the curved interface between the liquid and the surrounding air cause a very complex optical system which is not suitable for fine work due to refraction and scattering of the light.

It is, accordingly, an object of the present invention to provide a method of and apparatus for moving an object across the focal plane of an optical system in such a manner that the object is momentarily and precisely in the focal plane only once.

Accordingly, the main requirement of the method of the present invention is to suspend the object to be investigated in a fluid. Therefore, this method for the automatic observation of biological samples is limited to such material that naturally exists in the form of particles. Those are, for example, the cells of the blood, cells or small groups of cells spontaneously exfoliated from the epithelial surfaces and other body surfaces and those that are naturally or pathologically but spontaneously found in the urine, the peritoneal fluid, the pleural fluid, the vagina or the cervix, the respiratory tract, the alimentary tract, or the surface of the skin.

The present invention is particularly directed toward the classification, counting or physical segregation of biological cells. Cells usually have a nucleus containing desoxyribonucleic acid, a cytoplasm and an outer membrane surrounding the cytoplasm. The present invention is particularly related to the classification of those cells which cover the epithelial surfaces of the body. These surfaces continuously exfoliate either single cells or small, loose groups of cells.

The red blood corpuscles or erythrocytes and the white blood corpuscles or leucocytes are freely suspended in the plasm of the blood. Thus, these are cells normally suspended in a liquid. It should also be mentioned that normal red blood corpuscles, at least in the human being, do not have a nucleus, but the white blood cells do.

It is frequently necessary for diagnostic and other medical purposes to count the red and white blood cells of a patient. This is usually effected by first diluting the blood 100 times whereupon those red blood cells contained in a small chamber of known dimensions are counted under the microscope. The white blood cells are counted by first diluting the blood 20 times and by chemically destroying the red blood cells. Thereafter, those white blood cells contained in a similar counting chamber of known dimensions are also counted under the microscope.

It is also frequently required to classify white blood cells according to their morphology. This may require the measurement of the size of the nucleus as well as the size and staining reaction of the cytoplasm. This is presently effected by smearing a thin film of blood on a glass slide, staining it in a conventional manner, and to study under a microscope a certain number of white cells to classify them.

Attempts in the past to count both red and white blood cells simultaneously were abondoned. The reason for this is that in normal persons out of 80,000 cells only about 100 are white cells. Therefore, in order to obtain an accurate count of both red and white blood cells, it would be necessary to count a very large number of cells. Such a procedure is obviously very time consuming and expensive.

On the other hand, in order to count the red and white blood cells separately the blood must be diluted 100 times for counting the red cells and only 20 times for counting the white cells. If any mistake is made in either one of the two dilutions, the figures obtained for the white and red blood cells are wrong which might lead to an erroneous diagnosis.

Recently, a machine has been introduced for automatically counting blood cells by means of an electrical impedance principle. An electric current is established through a conductive liquid having cells suspended therein. When a cell crosses the path of the electric current, the intensity of the current is momentarily decreased. The resulting electric pulse may then be amplified and counted to determine the number of cells. It should be noted, however, that this machine only permits the counting of the number of cells such as either red or white blood cells. Platelets are non-nucleated particles which normally exist in the blood in much smaller numbers than the red blood cells. They are counted together with the red blood cells and this error may be disregarded. However, this machine does not permit to measure any characteristic of the cells.

It has also been proposed to count cells by optical gating. Here, each cell moves in the focal plane of a microscope which may be arranged with a dark field illumination. Accordingly, the focal plane is dark until light is scattered by a particle such as a cell within the focal plane. This scattered light is made to impinge upon an electronic photomultiplier to produce an output pulse which may then be counted to determine the number of cells or particles.

However, with both of these known machines, the red and the white blood cells have to be counted separately and a different dilution of the blood must be made to permit the separate counting of the erythrocytes and leucocytes.

It is accordingly one of the objects of the present invention to provide a method of and apparatus for counting both red and white blood cells simultaneously by using the same dilution and obtaining both the number of the red and of the white blood cells.

Another object of the invention is to provide a method of and apparatus for classifying white blood cells or other cells in accordance with predetermined characteristics such as, for example, the size of the nucleus and the staining reaction and the size of the cytoplasm.

It has long been recognized that the study of cells exfoliated from the epithelial surface of a human being, for example, permits the diagnosis of particular diseases, including the occurrence of certain types of cancer. For example, cells exfoliated from the female genital tract, such as the cervix, the urinary tract, the respiratory tract and other epithelial surfaces may include both normal cells and atypical or abnormal cells. From the research of the last twenty years it is well known that an atypical cell may be differentiated from a normal cell by the size of its nucleus, the volume of the cell, the absorption of ultraviolet light, particularly by the nucleus, the absorption of light after the nucleus has been stained, the emission of light when the cell has been stained with fluorescent stains and illuminated with ultraviolet light or the relation between the size of the cytoplasm and the size of the nucleus.

These criteria form, in part, the basis of the exfoliative cytology method of diagnosing certain types of cancer. This is the well-known Papanicolaou smear method for diagnosing cancer of the cervix, lungs and the like.

According to the cytologic method of Papanicolaou cells exfoliated from an epithelial surface are smeared on a glass slide, fixed and stained for observation under the microscope. The method may include the filtration of large amounts of urine, pleural, or peritoneal effusions through a membrane filter that retains both normal and abnormal cells. Then, the filter is attached to a glass slide, stained and mounted for study under the microscope. This procedure, of course, permits the concentration of both normal and abnormal cells. However, the proportion of normal and abnormal cells remains the same.

A further improvement that may be mentioned here is the use of trypsine, hyalorunidsase, and other chemicals to dissolve mucous-like substances which may surround some exfoliated cells such as sputum. The cells are then suspended in a liquid and filtered in the manner above described in connection with urine. Again, the proportion of normal and abnormal cells remains the same as that in the original sample.

The cytologic observation of exfoliated cells by the Papanicolaou method has proved to be very effective for the early detection of cancer. Some authors contribute to the application of this method the statistically observed decrease in deaths due to cancer of the cervix. Many medical authorities advise that every woman after a certain age should have a genital cytological examination made at least once every year. Hence, this procedure is currently in use either for the diagnosis of patients having certain symptoms or in asymptomatic individuals to detect cancer in its earliest stages. Obviously, the earlier cancer is diagnosed, the better the chances of curing it.

Although the Papanicolaou method is of amazing accuracy, it still has some limitations. As indicated above, normal and atypical, or cancerous cells occur mixed with each other. Usually, the atypical or cancerous cells occur in very small proportion particularly during the early stages of the disease. Therefore, the slides on which the cells are mounted must be screened looking for atypical cells. It takes from five to 20 minutes to screen a single slide. So, in any busy laboratory, that is, in practically all of them, the screening is effected by a technician who marks those areas which require review by a cytologist. Therefore, a screening technician can usually examine from 40 to 60 cases a day. There are not enough such technicians available to perform all the necessary work. The time required for this job and the necessary skill of the technicians involved have the result that this routine investigation becomes quite expensive.

Nevertheless, a false negative report occurs in about 10 percent of the positive cases. To a certain degree, this is due to the fact that there are so few suspicious cells, particularly in the early stages of the disease. Accordingly, the suspicious cells may be overlooked. In addition, the cells must be obtained from a sample and only a small portion of the sample is smeared and examined. Where the sputum is examined, the portion actually investigated may be less than one hundredth of the whole sample. Unfortunately, therefore, a negative report does not exclude the possibility of cancer.

It is accordingly a further object of the present invention to provide a method of and apparatus for classifying automatically cells suspended in a liquid into those which are normal and those which are atypical and might be cancer cells.

Still another object of the present invention is to classify automatically cells into normal and atypical or cancerous cells suspended in a liquid and to physically segregate them from each other thereby to provide a high concentration of suspicious cells, that is, those which are either atypical or possibly cancerous.

It should be noted that the segregated cells are subsequently filtered through a membrane filter which retains all of the selected suspicious cells. The membrane filter with the cells retained on it is stained by the Papanicolaou method and diagnosed under the microscope in the conventional cytologic procedure.

It will be apparent that a segregation of normal and atypical cells should prove of great advantage to the medical field and should permit a more accurate diagnosis with a smaller expenditure of time and effort. Thus, where the suspicious cells, that is, atypical or even cancerous cells are highly concentrated, the diagnosis by the classical methods of cytology is obviously more accurate and can be rapidly performed by a trained cytologist.

It is also frequently desired to study the function of the ovary. To this end, it is necessary to count and to classify under the microscope several hundred cells exfoliated from the vaginal epithelium studying their size and the size of the clumps of cells. Such a procedure permits a study of the ovary as well as the effects of hormones which might have been administered. For practical reasons, it is not possible to count and classify more than say 300 cells. On the other hand, since the number of cells involved in the count is rather small the result may be inaccurate.

It is accordingly still a further object of the present invention to count and classify cells or clumps of cells exfoliated from the vagina by classifying them in accordance with the size of the cytoplasm and the size of the nucleus.

It should be emphasized that the apparatus of the invention only classifies cells in accordance with predetermined criteria and may automatically segregate them in accordance therewith. However, any diagnosis on the basis of the cells still must be made by a highly skilled person such as a cytologist. The apparatus simply increases the number of suspicious cells compared with the number of normal cells.

It should also be noted that quanitative measurements of cell properties have previously been performed to serve as a basis for screening cells into normal and atypical cells. This has been reported by W. J. Horvath, W. E. Tolles, and R. C. Bostrom in the 1956 Transactions of the First International Cancer Cytology Congress, page 371. For example, Figs. 4 and 5 of this paper compare normal cells with those from cancer patients. For each cell, the ratio of cell diameter to nucleus diameter is measured as well as the nucleus extinction coefficient. The two figures clearly show that for cancerous cells, the ratio of cell diameter to nucleus diameter has decreased considerably indicating an increase of the diameter of the nucleus for cancerous cells as well as a smaller cytoplasm. A large nucleus and a proportionally small cytoplasm characterize neoplastic cells.

Fig. 6 of the same paper is a graph showing the per cent of cells exceeding certain criteria which coincide with confirmed cancer. Thus, this makes it clear that normal cells may be segregated from suspicious or atypical cells. In accordance with the present invention, this classification and physical segregation of the cells is done automatically and in a liquid medium.

Sometimes it is desirable to classify, count or segregate for further study particles suspended in a gas such as air. These particles may be liquid, solid, or of biologic nature. For example, this may be necessary to study air pollution, the dust levels in mines, factories or mills, or in research clean rooms. It may also be desirable to study and monitor the size distribution of aerosols or powdered industrial products.

It is accordingly a still further object of the present invention to provide an apparatus for and method of counting, classifying or segregating particles suspended in a gas.

In accordance with the present invention the cell size is measured. To this end, the particles or cells are suspended in a liquid and the suspended particles are caused to flow past a predetermined testing volume. A steady electromagnetic field is established within this testing volume. The change of the electromagnetic field caused by the passage of a particle or cell through the testing volume is measured. This, of course, determines the size of the cell.

The size of the nucleus is preferably measured by means of light. Thus, the nucleus may be stained to make it absorb visible light or fluorescent stains may be used to emit light when irradiated or else ultraviolet light may be used which is absorbed by the nucleus. Thus, light may be projected through the particle. Preferably, a compund microscope is utilized. A photomultiplier may be attached to the ocular of the microscope. This will detect and amplify the change in the light output caused by a nucleus which absorbs light. This permits to determine the size of the nucleus. This, in turn, makes it possible to determine the ratio of the sizes of the cytoplasm and the nucleus. Any cell having a particular size of the cytoplasm and of the nucleus or preferably a particular ratio may be separately counted and may be segregated from the other cells for further inspection by a cytologist.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is a schematic view and block diagram of an apparatus embodying the present invention for investigating and segregating cells in accordance with their characteristics such as the size of the cytoplasm and of the nucleus;

FIG. 2 is an isometric view of the diaphragm including the focal plane of the compound microscope of FIG. 1, and illustrating two electromagnets for establishing a steady electromagnetic field and means for adjusting the size of the effective aperture;

FIG. 3 is a vertical sectional view through the area about the focal plane of the microscope, and illustrating particularly the light condenser, the objective and the means for adjusting the effective aperture;

FIG. 4 is a schematic vertical sectional view of a modified microscope utilizing ultraviolet light which may be used in accordance with the present invention;

FIG. 5 is a schematic sectional view of a modified apparatus for segregating cells including an electric capacitor for developing a steady electrostatic field;

FIG. 6 is a schematic sectional view of a device similar to that of FIG. 5 but utilizing electrodes for establishing an electric field; and FIG. 7 is a schematic sectional view of a light condenser which may be used in connection with a microscope shown particularly in FIGS. 1 and 3.

Referring now to the drawings and particularly to FIGS. 1 through 3, there is illustrated an apparatus in accordance with the present invention for investigating microscopic particles such as cells and for segregating them in accordance with certain predetermined characteristics.

As shown particularly in FIG. 1, the apparatus includes a conventional compound microscope indicated generally at 10. The light source 11 is associated with the microscope 10 and may be a lamp having a ribbon filament and a pair of leads 12 connected to a suitable power supply and a suitable lens 13 for directing parallel light as indicated by the arrow 14 toward the microscope 10. The microscope includes a conventional light condenser 15 which may be a lens as shown for focusing the light onto the focal plane of the microscope. The microscope further conventionally includes an objective 16 which may be a compound lens as shown and may include three oculars or eye pieces 17. A system of light-splitting mirrors 9 or a conventional prism system may be used to split the single light beam from the objective 16 into several light beams which are received respectively by the eye pieces 17. It should be emphasized that while the compound microscope 10 is conventional, it does not require a revolving turret with a plurality of objectives to change the magnification. Also, the microscope 10 does not require any means for changing the focus nor does it require the conventional stage.

Disposed above each ocular 17 is a light-sensitive device such as photomultiplier 18 including a photosensitive cathode and a plurality of dynodes for multiplying the electron stream resulting from light impinging on the cathode. Between each ocular 17 and its photomultiplier 18 a diaphragm 19 may be disposed that masks a portion of the image such as a third of the image. However, each diaphragm 19 should mask a different portion of the image of the focal plane of the microscope. Accordingly, the photomultipliers 18 jointly see a complete image of an object in the focal plane. The photomultiplier 18 conventionally includes a well-regulated power supply. It is well known that the amplification obtained by a photomultiplier is critically dependent on the accelerating voltages applied to its dynodes. On the other hand, adjustment of the supply voltage permits ready control of the amplification of the photomultiplier. Instead of using a photomultiplier other conventional devices may be substituted such as a photocell or a TV camera without departing from the spirit and scope of the present invention.

The electronic circuitry illustrated schematically in block form in FIG. 1 will be subsequently explained.

There is provided a container 20 which contains a suspension of the microscopic particles to be classified and sorted. The container 20 may be provided with a scale 21 for measuring the volume of the liquid within the container. Thus, the container 20 may contain a suspension of cells. Epithelial cells to be studied may be processed in a conventional manner as follows:

The sample of the exfoliated cells to be classified and sorted is mixed with a physiological saline solution which is then shaken. Some samples require chemical digestion of the mucous-like substance surrounding and holding together the cells by one of several known methods. The solution containing the cells is filtered through a very fine sieve to remove big clumps of cells. Then, the solution is put into a centrifuge to concentrate the cells which form a sediment. This sediment is chemically stained in any conventional manner in order to stain only the nucleus of each cell. Subsequently, the sediment is washed with a saline solution. This solution is again subjected to centrifugation to eliminate the remaining chemical stain. Then, the cells are suspended again in a saline solution. In the case of blood, the blood may be diluted in a liquid including a suitable stain for staining the white blood cells. As a result of this treatment, the nucleus is stained while the outer cytoplasm remains practically without color. After the cells have been segregated, the suspension of the cells is filtered through a membrane filter to retain the cells. The filter is mounted on a glass slide and studied under the microscope. This procedure is conventional for cytologic investigations.

However, it should be noted that staining of the nucleus is not always required. All that is needed is to utilize a light of such a color or wave length including ultraviolet light that it is absorbed by the nucleus. It is well known that the nucleus of a cell consists essentially of desoxyribonucleic acid which absorbs ultraviolet light of the order of 2,500 AU. Thus, by using ultraviolet light of this wave length range and a suitable microscope having a quartz or a fluorite optical system, the nucleus will absorb the ultraviolet light without the necessity of staining it.

Alternatively, after staining the cells it is also feasible to utilize suitable color filters for differentiating between the color of the nucleus and the cytoplasm or for distinguishing other properties of the cells. This may make it possible, for example, to distinguish the age of the cells or to some extent their place of origin. In this connection, it is also feasible to utilize a microdensimeter and a fluorometric device for determining color absorption. In this manner leucocytes are classified.

A closed chamber 22 surrounds the light condenser 15 and the microscope objective 16 and is connected by a suitable conduit 23 to the container 20, preferably, by means of a valve 24. It should be noted that the volume generally indicated at 25 between the condenser 15 and the objective 16 and including the focal plane of the microscope may be filled with the suspension of cells from the container 20. Accordingly, the outer lens of the objective 16 and the outer lens of the condenser 15 are in contact with the liquid. A flask 26 is provided with an air-tight stopper 27 through which extends a hollow tube 28. The tube 28 may be connected by a plastic and non-deformable hose 30 to another tube 31 extending into the lower portion of the container 22 surrounding the microscope objective and condenser.

By means of a conduit 32 connected to the neck of the flask 26, the flask is connected to a vacuum system schematically indicated at 33. Accordingly, when the valve 24 is opened conduit 23, container 22, and conduits 30 and 32 are put under reduced pressure to aspirate the suspension in the container 20 into the container 22 and eventually into the flask 26.

Similarly, flasks 34 and 35 are each connected by respective conduits 36 and 37 to the container 22. This is effected by means of tubes 38 and 40 each of which terminates very closely to the focal plane of the microscope in the area between the condenser 15 and the objective 16. In turn, each of the flasks 34 and 35 is connected to the vacuum system 33 by conduits 41 and 42. A valve 43 interconnects the conduit 36 to the flask 34. Similarly, a valve 44 is connected between the conduit 37 and the flask 35. This makes it possible to selectively connect either the flask 34 or 35 to the vacuum system 33 thereby to suck any microscopical particles such as a cell by the action of the vacuum into the selected flask.

As shown particularly in FIGS. 2 and 3, there is provided a diaphragm or dividing wall 46 which separates the container 22 into an upper chamber 47 and a lower chamber 48. It will be noted that the exhaust tubes 31, 38, and 40 for the cells are disposed in the lower chamber 48. This diaphragm 46 is electrically insulating and opaque to whatever light is used in the optical system. This diaphragm 46 is provided with a small central aperture 50 through which the light is projected by the condenser 15 and across which the focal plane of the microscope extends.

The size of the opening 50 is made adjustable by means of two movable knife edges 51. These are adjustable by the knurled nuts 52 rotatable but not slidable in a slot in a housing extension 49 and disposed about the screw-threaded end 53 of each of a pair of bars 54 which, in turn, carry or are integral with the knife edges 51. Thus, by rotating the knurled nuts 52 in one direction or the other, the two knife edges 51 can be made to approach each other or to recede from each other thereby to adjust the size of the aperture through which the light is permitted to pass into the microscope. Of course, the knife edges 51 are equally opaque and nonconductive.

In accordance with the present invention, means are also provided for generating a steady magnetic field between the upper chamber 47 and the lower chamber 48. Instead of a magnetic field, it is also feasible to provide an electric field, the term electromagnetic field being used to cover both. For developing a magnetic field, there are provided two opposed iron rods 55 (see FIGS. 1 and 2) extending through the diaphragm 46 into the neighborhood of the central opening 40. A coil 56 is disposed at the outer end of each of the iron rods 55. Each of the coils 56 is connected to a suitable electrical power source such as battery 61 by means of leads 57. Hence, the electric current flowing through the two coils 56 will generate a steady magnetic field which exists particularly in the neighborhood of the focal plane of the microscope. Alternatively, a steady electric field may be developed by electrodes as will be described hereinafter in connection with FIG. 6 or by using a capacitor as illustrated in FIG. 5. Again, the electric field should be provided in the neighborhood of the focal plane.

Finally, a pair of electrical pickup electrodes is preferably provided in the neighborhood of the diaphragm opening 50. To this end, there may be provided a metal ring 58 which may, for example, be disposed about the condenser lens 15. Similarly, another metal ring 60 may be disposed about the objective 16 of the microscope.

The operation of the apparatus illustrated in FIGS. 1 to 3 will now be explained.

At first, a suspension of the cells is produced in the manner previously described. The nucleus may be stained or else light may be used of such a wave length that it is absorbed by the nucleus of the cells in question. In any case, the suspension is put into the container 20, the valve 24 is opened, and the vacuum system 33 is started so that both the upper chamber 47 and the lower chamber 48 are filled with the suspension.

It may be advisable to provide the container 20 with a conventional magnetic stirrer. This includes a rotating magnet which, in turn, causes the rotation of a suitable stirring mechanism. Otherwise, the cells in the suspension may tend to settle down.

Then the light source 11 is turned on and the photomultiplier is supplied with power. Also, the two coils 56 are connected to their battery 61. The apparatus is now ready to be used.

The liquid used for suspending the cells is preferably but not necessarily electricaly conductive. However, it preferably has a high electrical resistance. In any case, the dielectric constant of the liquid should differ from that of the cells to be classified.

By virtue of the steady magnetic field which is generated by the rods 55 and the coils 56, the passage of any cell through the central aperture 50 may be readily determined. The passage of a cell will disturb the magnetic field. The size of the disturbance will indicate the size of the cell. This change of the magnetic field can be sensed by the two electrodes 58 and 60. The signal picked up by the electrodes 58, 60 is an electric pulse which may be amplified by an amplifier 65.

To this end, the amplifier 65 has two input leads 66 and 67 connected respectively to the electrodes 60 and 58. The output of the amplifier 65 may be fed to two pulse height discriminators 70 and 71 connected in parallel. Each of these discriminators is arranged as a conventional differential pulse height discriminator so that it will transmit only electrical pulses having an amplitude or pulse height between two predetermined values.

The output of the pulse height discriminator 70 is fed to an amplifier 72 which, in turn, controls the valve 44 which is preferably a solenoid valve. Similarly, the output of pulse height discriminator 71 is fed to amplifier 73 which controls the solenoid valve 43. Thus, the valves 43 and 44 are opened by their respective amplifiers 72 or 73 which, in turn, are controlled by the pulse height discriminator 70 and 71.

To summarize, therefore, the valves 43 and 44 are opened in response to a cell passing through the aperture 50 which has a volume or diameter between two predetermined limits. These limits are adjustable by adjusting the discriminators 70 and 71. Depending on the size of the cell, it is either sucked in by the conduit 38 or by the conduit 40 and eventually deposited into either flask 34 or 35. On the other hand, if the volume of the cell is outside of the predetermined limits, the cell is discarded and eventually collected in the flask 26. Those cells are the normal cells which are of no further interest.

Further, in accordance with the present invention, the cells may also be classified and eventually segregated in accordance with the size of the nucleus. This is effected by the compound microscope 10. Every time a cell passes through the opening 50 from above to below, the focal plane of the microscope, the photomultiplier tubes 18 receive less light because the nucleus absorbs some of the light. This decrease of light causes a decrease of the electrical current at the output of the photomultipliers. The outputs of the photomultipliers 18 are gated through an anticoincidence circuit 69 having a predetermined dead time. In other words, the electronic valve 69 will pass the output pulse of the multipliers 18 and will thereafter remain insensitive for a predetermined length of time to any pulse from any one of the photomultipliers. The output of the electronic valve 69, in turn, is passed to an amplifier 74.

The output of the amplifier 74 is impressed on two pulse height discriminators 75 and 76 connected in parallel. Again, the two differential discriminators are arranged in such a way that they will only pass electrical pulses having a value between two predetermined limits. The output of the pulse height discriminator 75 is impressed on the amplifier 72 while that of the discriminator 76 is connected to the amplifier 73.

As a result, amplifier 72 will respond only if the size of the cell is within certain limits as determined by discriminator 70 while the size of its nucleus is within another pair of limits determined by the discriminator 75. Similarly, amplifier 73 responds to the two other sets of values of the cell volume and the size of the nucleus. It is to be understood that amplifiers 72 and 73 can readily be arranged to be responsive only to the size of the cell or only to the size of the nucleus.

These values, of course, will have to be set in accordance with experimental data some of which already exists as shown by the paper previously referred to.

It will readily be apparent that the cells can be sorted into one, two, or more different flasks depending on their characteristics by utilizing a smaller or larger number of discriminators such as 70, 71 and 75, 76.

Accordingly, the size of the nucleus and the size of the cytoplasm may be determined in one operation and entirely automatically. Such an operation, of course, requires much less time than if it were done by a person. The result of this segregation of the cells is that the number of suspicious or atypical cells can be vastly increased so that there is a greater chance and a greater certainty of diagnosing cancer if such exists. Also, this makes it possible to review or check the enriched atypical cells by a cytologist. It will, of course, be realized since the machine only classifies suspicious cells that in many instances the cells clearly indicates that there is no cancer. On the other hand, it is also possible to find cells exfoliated from the abnormal cervix which are usually called dysplasic. Normal cells, dysplasic cells, and cells from an in situ carcinoma have significant differences in the sizes of their nuclei and cytoplasms.

This has been described in a paper by George L. Wied, Gildardo Legorreta, Dietrich Mohr, and Andre Rauzy, which was published in Vol. 97 of the Annals of the New York Academy of Sciences, page 759 (September 29, 1962). Such dysplasic cells are interpreted by some researchers as an indication of a precancerous stage. Thus, any patient who who is found to have dysplasic cells can be carefully watched in subsequent years to improve the chances of finding cancer in its earliest stages.

It might be noted that it is relatively easy to dilute the cells in such a way to make sure that the selected cells are sucked into their respective conduits such as 38 or 40. Thus, assuming that there are four cells per cubic millimeter, this corresponds to four million cells in one liter. Such a concentration is sufficiently diluted to insure that each wanted cell is removed into its proper conduit. While, at the same time, insuring a minimum contamination by non-wanted cells. On the other hand, there are enough cells in the suspension to make sure that the sample being investigated is representative.

It should also be noted that the criteria are frequently different for different types of cancer. Hence, the pulse height discriminators, such as 70, 71, and 75, 76, can be arranged in such a manner that they will collect all cells which are not normal, that is, all atypical cells and that the atypical cells, in turn, are segregated in accordance with still other characteristics.

Preferably, the size of the aperture is adjusted by the knife edges 51 and 52 in accordance with the size of the cells or groups of cells which are being classified. The range of the size of the cells or group of cells is from five to 200 microns. Preferably, the aperture is about 10 times the diameter of the cells or groups of cells. Furthermore, the direction of the aperture is preferably perpendicular to the main diameter of the unmasked portion of the diaphragms 19.

It will also be evident how the apparatus of FIGS. 1 to 3 can be used for counting at the same time both red and white blood corpuscles in a suitable suspension. In the first place, the total number of corpuscles is counted by the amplifier 65. Those which have a nucleus, namely, the white blood corpuscles, are counted by the amplifier 74. Hence, subtracting one from the other, it is readily apparent that both the number of red and of white blood corpuscles can be counted simultaneously. However, there is one exception, namely, in some rare cases, nucleated red blood cells may be found in the blood stream. If desired, a conventional electronic counter may be coupled to the output of each of the amplifiers 66 and 74 thereby to count the number of cells and the number of nuclei which pass through the focal plane of the microscope. It is also feasible to connect a counter to the output of each amplifier 72 and 73 to count the number of cells with certain characteristics to be collected in flasks 34 and 35.

It may be noted that a magnetic field is established within the liquid rather than an electric current. In accordance with the prior art, an electric current is set up which, in turn, produces heat. Hence, the apparatus can be used for less than a minute at a time. The magnetic or static field produced in accordance with the present invention does not primarily produce an electric current and, hence, the heat is minimized. The magnetic field is disturbed by the movement of the liquid unless the liquid is non-conductive and does not have any magnetic dipoles. However, the disturbance of the magnetic field in proportion to the velocity of the liquid provides a means of measuring the volume of liquid that has passed. Furthermore, of course, the magnetic field is disturbed by the occurrence of a particle of cell as explained above.

Instead of producing a magnetic field, it is also feasible to produce a steady electric field as illustrated in FIG. 5. Thus, there is illustrated a tube 80 which represents any conduit through which suspended particles are flowing in the direction of arrows 81. A pair of insulated metallic electrodes 82 and 83 are disposed at the end of another, preferably, insulating cylinder or conduit 84. These electrodes 82 and 83 may be connected to a source of electric potential by leads 85 and 86, to provide an electric capacitor.

Accordingly, every time a cell passes through the metal electrodes 82, 83, the electric field is varied. This variation can be picked up either directly by the electrodes 82, 83 or by another suitable pair of electrodes. The cells may then be sucked up by the conduit 84 which may be connected to a vacuum by means of valves in the manner explained in connection with FIG. 1, or may be allowed to continue to flow through the conduit 81.

The devices of FIGS. 5 or 6 may also be arranged as a small pipette which is moved by hand through a container with a cell suspension for picking up particular cells.

As explained hereinbefore it is also feasible to utilize ultraviolet light which is absorbed by a nucleus so that the cell nucleus does not have to be stained. To this end, the arrangement of FIG. 4 may be used with advantage. Instead of using an optical lens system, which is transparent to ultraviolet light, such as quartz or fluorite, it may be more practical to utilize a reflecting system rather than a refracting system.

Thus, the compound microscope 10' of FIG. 4 includes various light reflecting lenses or surfaces 90 and 91 which may form the objective 16, 92 and 93 which may form the ocular 17 sealed by a quartz plate 89. The light source and condenser lens have been omitted. A cell 93 (not drawn to scale) is shown at the focal plane of the microscope. The light from the microscope is projected into the photomultiplier tube 18 which should have a photocathode responsive to ultraviolet light.

The suspended cells are housed in the container 20 which may be connected directly to the chamber 22 of the microscope. Since there are no refracting lenses the entire space between the objective 16 and the ocular 17 and up to the quartz plate 89 is open for the liquid.

It will be understood, of course, that the cells are again classified in accordance with the size or volume of the cytoplasm and the size of the nucleus in the manner previously explained by means of the arrangement illustrated in FIG. 1.

It should be noted that it is also feasible to use a microscope as shown in FIGS. 1 or 4 permitting a dark field illumination.

The arrangement of FIG. 6 to which reference is now made, again shows a glass tube or pipette 80 having a number of outlets 31, 38, and 40 which may be controlled in the manner previously explained. The glass tube 80 is surrounded by the suspension containing the particles to be classified. Thus, the glass tube 80 may be disposed in a container 96 having a suitable bottom wall 99. The liquid enters the tube 80 at the narrow top. The tube 80 is provided with two electrodes 97 and 98 which are connected, for example, to the two poles of a battery. These two electrodes 97 and 98 establish an electric field through the opening of tube 80. Hence, when a particle or cell crosses the opening of the tube the electric field between the two electrodes 97 and 98 is varied. This, in turn, can be detected and amplified either by electrodes 97, 98 or by additional pick-up electrodes in the manner previously explained.

FIG. 7 illustrates a light condenser which may be used in lieu of a condenser lens 15 illustrated in FIGS. 1 and 3. The lens arrangement of FIG. 7 permits to illuminate any object in the focal plane both by direct and tangential light. To this end, the condenser system includes a central lens system 100 and a peripheral or annular lens system 103 separated by an opaque cylinder 101. Each lens system 101 and 103 has its own light source (not shown). The central lens system 100 is substantially an objective lens in an inverted position. Such an arrangement is known for creating an illumination in a small area.

The peripheral lens system 103 consists substantially of an ordinary light condenser provided with a central aperture in which the central lens system 100 is disposed. The peripheral lens system 103 provides lateral illumination of the focal plane or field thus to provide what is generally called a dark field illumination.

It should be noted that generally the light condenser used for dark field illumination has a dark diaphragm disposed between the light source and the lens. This serves the purpose to eliminate light in the central area so that only the peripheral lens area is used. The same result is obtained with the arrangement of FIG. 7 except that the space not normally used is now utilized by the provision of the central lens system 100.

However, it will be understood that the peripheral lens system 103 may be used by itself to provide lateral illumination or dark field illumination. This may be done, for example, where the microscope is to be connected to a continuous flow so that the central aperture can be used to provide an outlet for the gas or liquid.

The arrangement of FIG. 7 is preferably used so that the lens systems 100 and 103 can be operated alternatively. Accordingly, when a particle crosses the dark field and, hence, scatters the light, the output of the photomultiplier may be used for turning off momentarily the light source associated with the peripheral lens system 103. At the same time, the light source is turned on for the central lens system 100. Thereupon, the output of the photomultiplier can be used again to turn off the light for the central lens system 100 and turn on the light of the outer lens system 103.

In view of the above description it will be appreciated that the structure of FIG. 7 permits to determine two different characteristics of a particle to be classified such as the total size of a cell and the size of the nucleus by means of both scattered and transmitted light. Hence, it is not necessary to utilize either a steady magnetic or steady electric field although the provision of such a field may be preferred.

It should be noted that the above described arrangement may be utilized for classifying particles suspended in a gas such, for example, as air. Also, the above-described apparatus may be connected in a pipe through which there is a continuous flow of a liquid or gas having suspended particles therein. These particles may then be counted, classified, or segregated for further study in accordance with the teachings of this invention.

There has thus been disclosed a method of and apparatus for classifying microscopic particles such as cells suspended in a liquid and for sorting them in accordance with predetermined characteristics. For example, it is possible to measure both the size of the cell and the size of its nucleus. It is further possible to classify and to segregate cells in accordance with certain predetermined values of the cell size and nucleus size. This operation takes place automatically.

Hence, it is possible to vastly increase the number of suspicious or atypical cells in a sample of cells. This, in turn, should greatly facilitate diagnosis of cancer and the like. It is also possible to utilize this apparatus for determining the effects of hormones on the vaginal epithelium or the function of the ovary. Another application of the method of and apparatus of the present invention is for counting simultaneously both red and white blood cells without the necessity of using separate dilutions for the red cells and for the white cells. Also, it is feasible to classify the white blood cells according to the size of the nucleus and the color and size of the cytoplasm, provided that the leucocytes have previously been differentially stained.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims, wherein various portions have been separated for clarity of reading and not for emphasis.

I claim:

1. Apparatus for investigating microscopic particles suspended in a transparent liquid, comprising:
    a. a microscope having a focal plane;
    b. means for causing the suspension of particles to flow in a path passing once from one side to the other through said focal plane;
    c. means for illuminating said focal plane; and
    d. means for detecting changes of the light absorbed by each particle as it flows through said focal plane.

2. Apparatus as defined in claim 1 wherein further means is provided for tangentially illuminating said focal plane, and additional means for detecting the light scattered by each particle passing through said focal plane.

3. Apparatus as defined in claim 1 wherein each particle is stained by a fluorescent stain, and additional means is provided for detecting the fluorescence of each particle passing through said focal plane.

4. Apparatus as defined in claim 1 wherein means is provided for detecting the light absorbed by a plurality of areas of the image of each particle passing said focal plane, thereby to investigate the internal structure of the particle investigated.

5. A method of classifying microscopic particles which comprises the steps of:
    a. suspending the particles in a liquid;
    b. causing the suspended particles to flow across a predetermined testing plane;
    c. illuminating the testing plane with both direct and indirect light;
    d. measuring the light scattered by each particle as it passes the testing plane to detect one characteristic of the particle; and
    e. measuring the absorption of the light by the same particle to detect simultaneously another characteristic thereof.

6. Apparatus for investigating complex particles suspended in a transparent liquid, said apparatus comprising:
    a microscope having a focal plane;
    means for causing the suspension of particles to flow through said focal plane;
    means for alternately illuminating said focal plane by direct and by tangential light to provide alternately a dark field illumination;
    means for detecting changes of the light absorbed by each particle as it flows through said focal plane; and
    means for detecting the light scattered by each particle as it flows through said focal plane.

7. A method of automatically classifying complex microscopic particles by means of a microscope having a focal plane comprising the steps of:
    suspending the particles in a transparent liquid;
    causing the suspension of particles to flow in a path passing from one side to the other through the focal plane of the microscope;
    illuminating the focal plane with light partially absorbed by the particles, thereby to produce an image of each particle flowing through the focal plane; and
    detecting changes of the light partially absorbed by each particle as it flows through the focal plane.

8. The method defined in claim 7 wherein at least a portion of each particle is stained with a stain.

9. A method of automatically classifying complex microscopic particles by means of a microscope having a focal plane comprising the steps of:
    suspending the particles in a transparent liquid;

causing the suspension of particles to flow through the focal plane of the microscope;

staining at least a portion of each particle with a fluorescent stain capable of fluorescing when illuminated with light;

illuminating the focal plane with light causing fluorescence of the stain and being partially absorbed by the particles, thereby to produce an image of each particle flowing through the focal plane;

detecting changes of the light partially absorbed by each particle as it flows through the focal plane; and detecting the florescence caused by the stain on each particle as it flows through the focal plane.

10. A method of automatically classifying cells comprising the steps of:

suspending the cells in a liquid medium, thereby to isolate them from each other;

moving the suspended cells one by one and as discrete units past a predetermined measuring station;

detecting individually the image of a number of individual areas of each cell as the cell flows past the measuring station, thereby to determine the characteristics of the internal structure of each cell; and classifying each cell in accordance with the characteristics determined.

11. A method of investigating complex microscopic particles having interior characteristics comprising the steps of:

suspending the particles in a liquid medium, thereby to isolate them from each other;

moving the suspended particles one by one and as discrete units past a predetermined measuring station;

automatically determining at least two characteristics of the interior of each particle; and classifying each particle in accordance with the characteristics determined.

12. The method defined in claim 11 wherein an interior characteristic of each particle is measured by determining the absorption of light for the purpose of classifying each particle.

13. The method defined in claim 11 wherein at least a portion of each particle is stained and wherein the change of light is measured in a number of areas of each particle as it passes the measuring station, thereby to determine characteristics of each particle.

14. A method of investigating complex microscopic particles having interior characteristics comprising the steps of:

suspending the particles in a liquid medium, thereby to isolate them from each other;

moving the suspended particles one by one and as discrete units past a predetermined measuring station;

measuring the size of each particle as it flows past the measuring station;

automatically determining at least one characteristic of the interior of each particle; and classifying each particle in accordance with the characteristic determined and its size.

* * * * *

UNITED STATES PATENT OFFICE
CERTIFICATE OF CORRECTION

Patent No. 3,770,349          Dated   November 6, 1973

Inventor(s) Gildardo Legorreta-Sanchez

It is certified that error appears in the above-identified patent and that said Letters Patent are hereby corrected as shown below:

On first page the inventor's name "Gilardo Legorreta-Sanchez" should be cancelled and --Gildardo Legorreta-Sanchez-- substituted therefor.

In the address "Hubbard Blvd., Los Angeles, Calif." should be cancelled and --2159 Mexico Avenue, Guadalajara, Jal., Mexico-- substituted therefor.

Signed and sealed this 16th day of April 1974.

(SEAL)
Attest:

EDWARD M.FLETCHER,JR.　　　　　　　　C. MARSHALL DANN
Attesting Officer　　　　　　　　　　　Commissioner of Patents